(12) United States Patent
Mieth et al.

(10) Patent No.: US 9,820,072 B2
(45) Date of Patent: Nov. 14, 2017

(54) PRODUCING A MULTICHANNEL SOUND FROM STEREO AUDIO SIGNALS

(71) Applicants: Helmut Schmidt Universität, Universität der Bundeswehr Hamburg, Hamburg (DE); Hamburg Innovation GmbH, Hamburg (DE)

(72) Inventors: Martin Mieth, Leipzig (DE); Udo Zölzer, Neu Wulmstorf (DE)

(73) Assignees: HELMUT-SCHMIDT-UNIVERSITÄT UNIVERSITÄT DER BUNDESWEHR HAMBURG (DE); HAMBURG INNOVATION GMBH (DE)

( * ) Notice: Subject to any disclaimer, the term of this patent is extended or adjusted under 35 U.S.C. 154(b) by 151 days.

(21) Appl. No.: 14/424,533

(22) PCT Filed: Aug. 29, 2013

(86) PCT No.: PCT/EP2013/067921
§ 371 (c)(1),
(2) Date: Jul. 29, 2015

(87) PCT Pub. No.: WO2014/033222
PCT Pub. Date: Mar. 6, 2014

(65) Prior Publication Data
US 2015/0334500 A1  Nov. 19, 2015

(30) Foreign Application Priority Data

Aug. 31, 2012 (DE) .......................... 10 2012 017 296

(51) Int. Cl.
*H04S 3/00* (2006.01)
*H04L 29/06* (2006.01)
(Continued)

(52) U.S. Cl.
CPC .............. *H04S 3/00* (2013.01); *H04L 65/601* (2013.01); *H04S 5/005* (2013.01); *H04S 7/302* (2013.01);
(Continued)

(58) Field of Classification Search
None
See application file for complete search history.

(56) References Cited

U.S. PATENT DOCUMENTS 7,567,845 B1     7/2009   Avendano et al.
2004/0212320 A1*  10/2004  Dowling ................. H04S 5/005
                                                              315/291

(Continued)

OTHER PUBLICATIONS

Avendano et al, "A frequency-domain approach to multichannel upmix." Jul. 15, 2004. pp. 1-10.*

(Continued)

*Primary Examiner* — Curtis Kuntz
*Assistant Examiner* — Qin Zhu
(74) *Attorney, Agent, or Firm* — Lerner, David, Littenberg, Krumholz & Mentlik, LLP (57) ABSTRACT

The invention relates to a method for generating a multichannel audio signal (600, 700) from a stereo audio signal (100, 200), having the following steps: ascertaining a first panning coefficient (310) and a second panning coefficient (320) of the stereo audio signal; ascertaining a direct signal (515) as well as a first surroundings signal (510) and a second surroundings signal (520) from the first audio signal and the second audio signal and from the first panning coefficient and the second panning coefficient; ascertaining a plurality of repanning coefficients (410, 415, 420) from the panning coefficients, each repanning coefficient of the plurality of repanning coefficients being assigned to an audio channel (580, 585, 590) of a plurality of audio channels of the multichannel audio signal; calculating each direct signal (Continued)

using each of the repanning coefficients of the plurality of repanning coefficients; and converting each audio channel into a playback signal (600, 700) of the multichannel audio signal, each playback signal being provided for a respective playback device.

12 Claims, 2 Drawing Sheets

(51) Int. Cl.
*H04S 5/00* (2006.01)
*H04S 7/00* (2006.01)

(52) U.S. Cl.
CPC ....... *H04S 2400/05* (2013.01); *H04S 2400/07* (2013.01)

(56) References Cited

U.S. PATENT DOCUMENTS

| | | | |
|---|---|---|---|
| 2007/0041592 A1* | 2/2007 | Avendano | H04S 1/007 381/99 |
| 2009/0092259 A1* | 4/2009 | Jot | H04S 3/02 381/17 |
| 2011/0116638 A1* | 5/2011 | Son | H04S 3/008 381/1 |

OTHER PUBLICATIONS

Cobos et al, "Interactive Enhancement of Stereo Recordings Using Time-Frequency Selective Panning." Oct. 8, 2010. pp. 1-12.*

Avendano C, Frequency-Domain Source Identification and Manipulation in Stereo Mixes for Enhancement, Suppresssion and Re-Panning Applications. Applications of Signal Processing to Audio and Acoustics, IEEE Workshop, Oct. 19-22, 2003, pp. 55-58.

Avendano Carlos et al., A Frequency-Domain Approach to Multichannel Upmix, JAES, AES, vol. 52, No. 7/8, Jul. 1, 2002, pp. 740-749.

Baek Yong-Hyun et al., Efficient Primary-Ambient Decomposition Algorithm for Audio Upmix, AES Convention 133, Oct. 25, 2012.

Chun et al., Upmixing Stereo Audio into 5.1 Channel Audio for Improving Audio Realism, Communications in Computer and Information Science, Springer, DE, vol. 61, Jan. 1, 2009, pp. 228-235.

Cobos Maximo et al., Interactive Enhancement of Stereo Recordings Using Time-Frequency Selective Panning. Conference, 40th International Conference Spatial Audio, Sense the Sound of Space, 12 pages, Oct. 8, 2010.

Goodwin et al., Primary-Ambient Signal Decomposition and Vector-Based Localization for Spatial Audio Coding and Enhancement, 2007 IEEE International Conference on Acoustics, Speech and Signal Processing, Apr. 15-20 Hnolulu, HI, pp. 1-9.

International Search Report for PCT Application No. PCT/EP2013/067921 dated Dec. 3, 2013.

Jeon et al., Robust Representation of Spatial Sound in Stereo-to-Multichannel Upmix, Audio Engineering Society, Convention Paper 7976, Presented at the 128th Convention, May 22-25, 2010, London UK.

Jot et la., Apatial Enhancement of Audio Recordings, AES 23rd International Conference, Copenhagen, Denmark, May 23-25.

Pulkki, Virtual Sound Source Positioning Using Vector Base Amplitude Panning, Audio Engineering Society, vol. 45, No. 6, S. 456-466, Jun. 1997.

* cited by examiner

PRODUCING A MULTICHANNEL SOUND FROM STEREO AUDIO SIGNALS

CROSS-REFERENCE TO RELATED APPLICATIONS

This application is a U.S. National-Stage entry under 35 U.S.C. §371 based on International Application No. PCT/EP2013/067921, filed Aug. 29, 2013 which claims priority to German Patent Application No. 10 2012 017 296.6, filed Aug. 31, 2012 which are all incorporated herein by reference in their entirety.

TECHNICAL FIELD

The embodiments described here relate to a method for the processing and upgrading of a stereo audio signal. In particular the invention relates to a method for the generation of a multichannel audio signal from a stereo audio signal.

BACKGROUND

In addition, other objects, desirable features and characteristics will become apparent from the subsequent summary and detailed description, and the appended claims, taken in conjunction with the accompanying drawings and this background.

Stereo audio signals and devices for the playback of stereo audio signals are characterized by the fact that different audio information is provided to the listener of the stereo audio data or stereo audio information via two audio channels, so that the listener gains the impression of a spatial audio experience. Multichannel audio systems are characterized by the fact that they provide to the listener a multitude, in particular more than two, of audio signals, in order thereby to improve the listening experience. For example, there are multichannel audio systems with five or seven sound sources of known art, which are to be arranged around the listener in a specified arrangement, in order thereby to enable an optimal spatial audio experience. Here, for example, a direct signal and a plurality of surround signals are provided to the listener via the various channels, so that the listener gains the impression of being among a multitude of sound sources arranged in a particular manner.

SUMMARY

A method and a device are provided in accordance with the features of the independent patent claims. Embodiments of the invention can be derived from the dependent claims, together with the following description.

Features that are described in the context of the method apply in an analogous manner to the device also.

It can be considered an object of the invention to specify an alternative and improved method for the generation of a multichannel audio signal from a stereo audio signal, together with a device for the execution of this method.

In accordance with a first aspect of the invention a method is specified for the generation of a multichannel audio signal from a stereo audio signal, wherein the stereo audio signal has a first audio signal for a left-hand playback device and a second audio signal for a right-hand playback device. The method comprises the following steps:

Determination of a first power level of the first audio signal, and a second power level of the second audio signal.

Determination of the autocorrelations of each one of the first audio signal and the second audio signal, and determination of the cross correlation of the first audio signal and the second audio signal.

Determination of a similarity function from the ratio of the expectation value of the cross correlation, and the expectation value of the sum of the autocorrelations of the first and second audio signals.

Determination of a first partial similarity function as the ratio of the cross correlation of the first and second audio signals and the autocorrelation of the first audio signal.

Determination of a second partial similarity function as the ratio of the cross correlation of the first and second audio signals and the autocorrelation of the second audio signal.

Determination of a first panning coefficient and a second panning coefficient of the stereo audio signal, wherein the first panning coefficient is determined on the basis of all of the first and second partial similarity functions and the similarity function of the first and second audio signals, and the second panning coefficient is determined on the basis of the first panning coefficient, wherein the first panning coefficient and the second panning coefficient are adapted so as to position a phantom sound source in a listening region or listening area between the left-hand playback device and the right-hand playback device.

Determination of a direct signal and a first surround signal and a second surround signal from all four of the first audio signal and the second audio signal, together with the first panning coefficient and the second panning coefficient. Determination of a multitude of repanning coefficients from the panning coefficients, wherein each repanning coefficient of the multitude of repanning coefficients is assigned to a sound channel of a multitude of sound channels of the multichannel audio signal, wherein the repanning coefficients for the multitude of sound channels are adapted so as to position a phantom sound source in a listening region between a multitude of playback devices for the multichannel audio signal, wherein from the multitude of playback devices for the multichannel audio signal one playback device is assigned in each case to a sound channel of the multitude of sound channels (every one of the playback devices is assigned to one of the sound channels, respectively).

Processing of the direct signal in each case with each of the repanning coefficients of the multitude of repanning coefficients (the direct signal is processed with each one of the repanning coefficients, respectively), wherein the direct signal processed with a first repanning coefficient, together with the additively added first surround signal, is assigned to a first sound channel, the direct signal processed with a second repanning coefficient is assigned to a second sound channel, and the direct signal processed with a third repanning coefficient and the additively added second surround signal is assigned to a third sound channel.

Conversion of each sound channel in each case into a playback signal of the multichannel audio signal (each sound channel is transferred to one of the playback signals, respectively), wherein each playback signal is provided in each case for a playback device (each playback signal is provided to one playback device, respectively).

The method as described above and hereinafter can, for example, be applied in order to carry out, on stereo audio signals present on a storage medium, or on stereo audio signals transferred via a wired or a wireless data network, an upgrading to a multichannel audio signal. Similarly the method can serve to upgrade stereo audio signals during a calculation phase into a multichannel audio signal, wherein in the calculation phase, for example, the multichannel audio signal can simply be stored on a storage medium for a playback phase subsequent to the calculation phase, i.e. a direct and immediate playback of the generated multichannel audio signal can be left out or waived in the calculation phase. Alternatively the upgrading of a stereo audio signal can take place in real time for immediate playback as a multichannel audio signal, for example if an audio signal is transferred or is present as a stereo audio signal, such as, for example, a radio signal or a sound signal of a television transmission or other video, or audio, or combined video/audio, transmission.

A stereo audio signal, which in the method as described above and hereinafter serves as an original signal for the editing and processing, i.e. for the upgrading to a multichannel audio signal, can be understood to include in particular audio signals or audio information, compressed or coded with any kind of coding method, in any format suitable for the transfer and playback of audio information. The stereo audio signal can, for example, take the form of music, speech or surrounding noise, which derive from a recording of a real scene, or are the result of synthetic worlds, for example in computer-animated environments, or virtual worlds, together with computer games.

The panning coefficients are multiplicatively processed with, in each case, an audio signal of the stereo audio signal (each panning coefficient is processed with one of the audio signals, respectively), and influence the positioning of a phantom sound source between the playback devices that are present, i.e. in the case of a stereo audio signal, between the two loudspeakers which are adapted so as to playback the stereo audio signal.

For purposes of upgrading the stereo audio signal into a multichannel audio signal the panning coefficients of the stereo audio signal are firstly to be determined, in order then to determine or to extract from the stereo audio signal a direct signal and at least one surround signal, for example, two surround signals, four surround signals, or six or more surround signals. Here the first audio signal, the second audio signal, together with the first panning coefficient and the second panning coefficient, are taken as a basis, as is further below described in detail.

A stereo audio signal comprises two panning coefficients, since the stereo audio signal consists of two audio signals. In order to achieve an upgrading of the stereo audio signal into a multichannel audio signal, a multitude of repanning coefficients must be determined from the panning coefficients of the stereo audio signal, wherein one of the repanning coefficients is assigned to each sound channel of the multichannel audio signal. For example, the multichannel audio signal can comprise three sound channels, which are adapted for the positioning of the phantom sound source. In this case three repanning coefficients must be available. Only by the presence of, for example, three sound channels can a positioning of the phantom sound source take place that is improved in comparison with the stereo audio signal with two sound channels.

In accordance with an embodiment of the invention the method further comprises the step: Output of each sound channel to, in each case, one playback device (each sound channel is outputted to one of the playback devices, respectively).

In this manner the method can be adapted so as to output the determined playback signals directly to a playback device, for example a loudspeaker.

In accordance with another embodiment of the invention the method further comprises the step: Output of each sound channel to a recording unit.

Here a sound channel, alternatively or additionally to the output to a loudspeaker, can also be outputted to a recording unit. At the same time the recording unit can in particular serve the purpose of storing multichannel audio signals for later playback, preparation or further processing. A recording unit can, for example, be a computer-readable medium, such as e.g. a hard disk, a CD-ROM, a DVD-ROM, or a flash memory.

In accordance with another embodiment of the invention a power level adjustment of the sound channel takes place before the output of each sound channel, in each case, to a playback device or a recording unit, such that, in each case, the power level of the surround signal is reduced relative to that of the processed direct signal.

This power level adjustment can be particularly advantageous if, due to characteristics of the original signal, i.e. of the stereo audio signal, a mismatch ensues between the direct signal and the surround signals, and thus the one could drown out the other unfavourably.

In accordance with another embodiment of the invention, the sum of the first audio signal and the second audio signal is low-pass filtered and thus represents a low-frequency sound channel, which is implemented as one of the sound channels of the multi-channel audio signal.

The low-frequency sounds of a stereo audio signal ensue primarily from its first audio signal and its second audio signal, without these having to be divided into their direct signal and surround signal components for the determination of the low-frequency sound channel.

In accordance with another embodiment of the invention, a fourth panning coefficient and a fifth panning coefficient are determined from the first surround signal and the second surround signal, wherein the fourth panning coefficient and the fifth panning coefficient are adapted so as to determine components of the direct signal contained in the first surround signal and the second surround signal, wherein in each case the first surround signal and the second surround signal are reduced by the components of the direct signal that are contained in them. Here the reduced first surround signal is assigned to a left-hand rear sound channel, and the reduced second surround signal is assigned to a right-hand rear sound channel.

In the case of a multichannel audio configuration consisting, for example, of three front sound channels and two rear sound channels the direct signal is located purely on the front sound channels, wherein on the rear sound channels, namely the left-hand rear sound channel and the right-hand rear sound channel, only a component of the surround signal is played back. For the positioning of the phantom sound source importance is primarily attached to the front sound channels.

The fourth panning coefficient and the fifth panning coefficient enable a refinement of the surround signals, since the surround signals have a direct signal component, which can be eliminated by means of the fourth panning coefficient and the fifth panning coefficient.

In accordance with another embodiment of the invention, the fourth panning coefficient and the fifth panning coefficient are adapted so as to determine in the first surround signal and the second surround signal components of a sixth surround signal and a seventh surround signal, wherein the sixth surround signal and the seventh surround signal correspond in each case to another sound channel of the multichannel audio signal (each of the sixth and seventh surround signal corresponds to one additional sound channel, respectively).

From a multichannel audio signal with, for example, five sound channels this therefore enables the provision of a multichannel audio signal with seven sound channels, as a result of which the listening experience of a listener to the multichannel audio signal can be further improved.

In accordance with another embodiment of the invention, the fourth panning coefficient and the fifth panning coefficient are determined iteratively from the reduced first surround signal and the reduced second surround signal, wherein before each iteration of the determination of the fourth panning coefficient and the fifth panning coefficient the first surround signal and the second surround signal are reduced by the components of the direct signal that are contained in them.

Here an iterative determination or iteration is understood to be the execution of the cited operation and the feedback of the calculated signals to the input. This iteration or repeated determination of the fourth and fifth panning coefficients can thereby take place any number of times, wherein a higher number of iterations corresponds to an improved quality of the multichannel audio signal thus determined.

In accordance with another embodiment of the invention the first panning coefficient and the second panning coefficient of the first audio signal and the second audio signal are calculated for a multitude of frequencies of the stereo audio signal.

This enables the phantom sound sources also to be individually positioned in the listening region for audio signals of various frequencies, via the panning coefficients calculated in each case for this purpose, and the repanning coefficients subsequently determined from these.

The panning coefficients and the repanning coefficients can be determined at fixed or variable frequency intervals of the stereo audio signal. For example, all coefficients can be determined in each case at a fixed frequency interval of 10, 20, 50 or 100 Hz; but they can also be calculated in a low frequency range below 2000 Hz at 50 Hz intervals, in a medium frequency range between 2000 and 8000 Hz at 100 Hz intervals, and in a high frequency range above 8000 Hz at 200 Hz intervals. Here it can be held basically that with smaller frequency intervals, at which the panning coefficients and repanning coefficients are calculated, a better detection of phantom sound sources in the stereo audio signal can be made possible, and thus a qualitatively higher quality multichannel audio signal can be provided. In an exemplary form of embodiment the frequency interval can be 20 Hertz.

Needless to say, these remarks apply in an analogous manner for all steps of the method, since these steps of the method can also be executed in any recalculation of the panning coefficients and repanning coefficients.

In accordance with another embodiment of the invention the first panning coefficient and the second panning coefficient of the first audio signal and the second audio signal can be recurrently redetermined, in each case after a defined period of time.

This means that the steps of the method are recurrently executed for each sample point of an input signal, and the output signals applicable for the said sample point are determined for the multichannel audio signal. Over a longer period of time the recurrent and repeated execution of the method steps thus ensues for each individual sample point of a multitude of sample points of the input signal, i.e. of the stereo audio signal.

In accordance with another aspect of the invention a method is provided for the generation of a multichannel audio signal from a stereo audio signal, the method comprising the steps: Transformation of a first audio signal and a second audio signal of the stereo audio signal from the time domain into the frequency domain; Execution of the method as described above in the frequency domain; Transformation of the playback signals from the frequency domain into the time domain.

The above described calculation operations can, for example, be executed more simply and faster in the frequency domain, so that the execution of the method in the frequency domain could be advantageous, in that the calculation time required for these steps is reduced.

In accordance with another aspect of the invention an audio signal processing device is provided for the generation of a multichannel audio signal from a stereo audio signal with a first audio signal and a second audio signal, the audio signal processing device having:

A panning coefficient calculation unit, which is adapted so as to determine a first panning coefficient and a second panning coefficient from the stereo audio signal, wherein the first panning coefficient and the second panning coefficient are adapted so as to position a phantom sound source in a listening region between a left-hand playback device and a right-hand playback device;

The first panning coefficient calculation unit is furthermore adapted so as to determine a first power level of the first audio signal and a second power level of the second audio signal, to determine the autocorrelation of the first audio signal and the second audio signal, and to determined the cross correlation of the first audio signal and the second audio signal, to determine a similarity function from the ratio of the expectation value of the cross correlation and the expectation value of the sum of the autocorrelations of the first and second audio signals, to determine a first partial similarity function as a ratio of the cross correlation of the first and second audio signals and the autocorrelation of the first audio signal, to determine a second partial similarity function as a ratio of the cross correlation of the first and second audio signals and the autocorrelation of the second audio signal, wherein the first panning coefficient is determined on the basis of the first and second partial similarity functions, together with the similarity function of the first and second audio signals, and the second panning coefficient is determined based on the first panning coefficient.

A signal extraction unit, which is adapted so as to determine a direct signal and a first surround signal and a second surround signal from the first audio signal and the second audio signal, and from the first panning coefficient and the second panning coefficient;

A repanning coefficient calculation unit, which is adapted so as to determine a multitude of repanning coefficients from the panning coefficients, wherein each repanning coefficient of the multitude of repanning coefficients is assigned to a sound channel of a multitude of sound channels of the multichannel audio signal, wherein the repanning coefficients are adapted for the multitude of sound channels so as to position a phantom sound source in a listening region between a multitude of playback devices for the multichannel audio signal, wherein from the multitude of playback devices for the multichannel audio signal one playback device can be assigned in each case to a sound channel of the multitude of sound channels (each one of the playback devices can be assigned to one sound channel, respectively);

A processing unit, which is adapted so as to process the direct signal in each case with each of the repanning coefficients of the multitude of repanning coefficients, wherein the direct signal processed with a first repanning coefficient, together with the additively added first surround signal, can be assigned to a first sound channel, the direct signal processed with a second repanning coefficient is assigned to a second sound channel, and the direct signal processed with a third repanning coefficient, together with the additively added second surround signal, can be assigned to a third sound channel.

In accordance with one embodiment of the invention the audio signal processing device further comprises:

A stereo audio signal transformation unit, which is adapted so as to transform the stereo audio signal from the time domain into the frequency domain, and a scaling unit, which is adapted so as to carry out a power level adjustment of each sound channel of the multitude of sound channels, and a multichannel audio signal transformation unit, which is adapted so as to transform the power level adjusted sound channels from the scaling unit from the frequency domain into the time domain.

In accordance with another aspect of the invention a computer program element is specified for the control of an audio signal processing device, wherein the computer program element is adapted so as to instruct the audio signal processing device so as to implement the method described above and hereinafter.

In accordance with another aspect of the invention a computer-readable medium is provided, which stores the computer program element. The computer-readable medium can take the form of all volatile or non-volatile memories that can be read by a computer, for example a main memory of a computer, a hard disk, or exchangeable storage media such as e.g. CD-ROMs, DVD-ROMs, USB memories.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

The representations in the figures are schematic and not to scale.

Where the same reference numbers are used in the following description of the figures, these indicate the same or similar elements.

Figure 1:
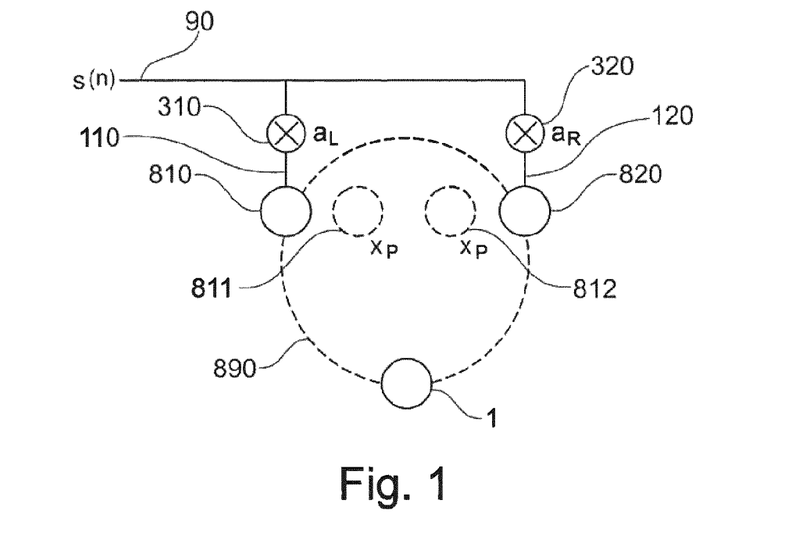
FIG. 1 shows a stereo audio configuration.

FIG. 1 shows the effect of the panning coefficients contained in a stereo audio signal, i.e. the effect of the panning coefficients on an audio signal, together with the positioning of a phantom sound source that is thereby caused.

The original audio signal 90 is processed with a first panning coefficient 310 or with a second panning coefficient 320, and is assigned to a first loudspeaker 810 or a second loudspeaker 820 respectively. From the processing of the original audio signal with the panning coefficients 310 or 320 there ensues a first audio signal 110 or a second audio signal 120 respectively, which corresponds to the stereo audio signal, and wherein one or a plurality of phantom sound sources 811, 812 can be positioned in the listening region 890 as a function of their frequencies.

In that the first loudspeaker 810 plays back a signal that deviates from that of the second loudspeaker 820, a listener 1 receives the impression that a phantom sound source 811, 812 is positioned in the listening region 890. The positioning of the phantom sound sources 811, 812 can be controlled via the dimensioning of the panning coefficients 310, 320.

As described above, the determination of individual panning coefficients for various frequencies of the stereo audio signal 100 contributes to the ability to position the signals of various frequencies individually in the listening region 890. This is illustrated by the phantom sound sources 811, 812 that are shown spaced apart from each other.

Figure 2:
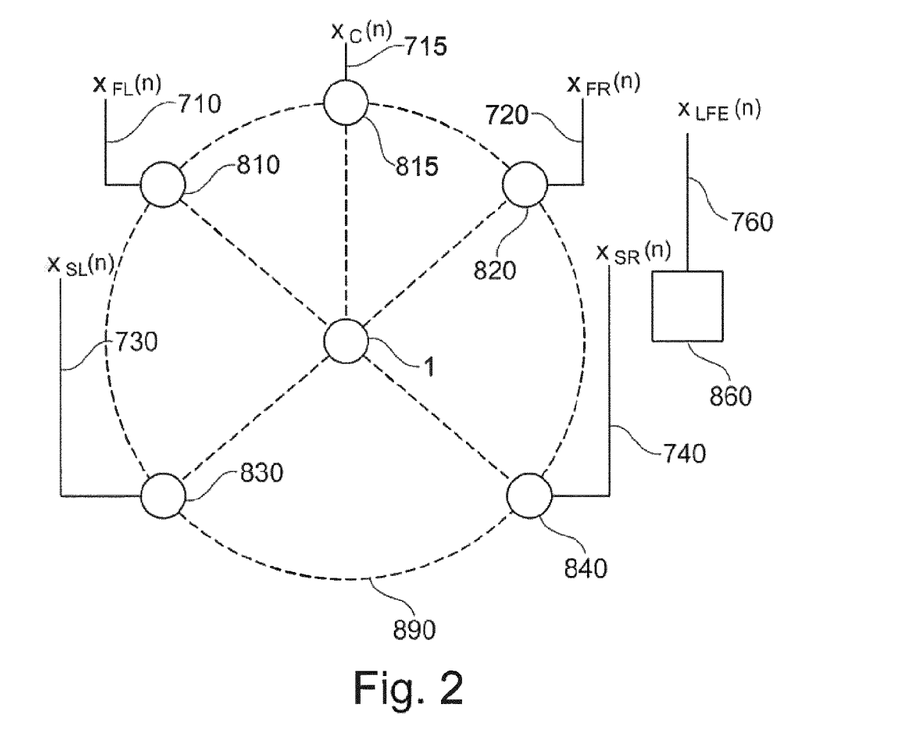
FIG. 2 shows a multichannel audio configuration.

FIG. 2 shows a multichannel audio configuration, wherein the listener 1 is surrounded in the listening region 890 by five loudspeakers 810, 815, 820, 830, 840, wherein in addition a low-frequency loudspeaker 860 is illustrated.

Each of the loudspeakers receives its own playback signal. By means of the arrangement of the loudspeakers around the listener a spatial listening experience can be improved relative to that of a stereo audio configuration.

Figure 3:
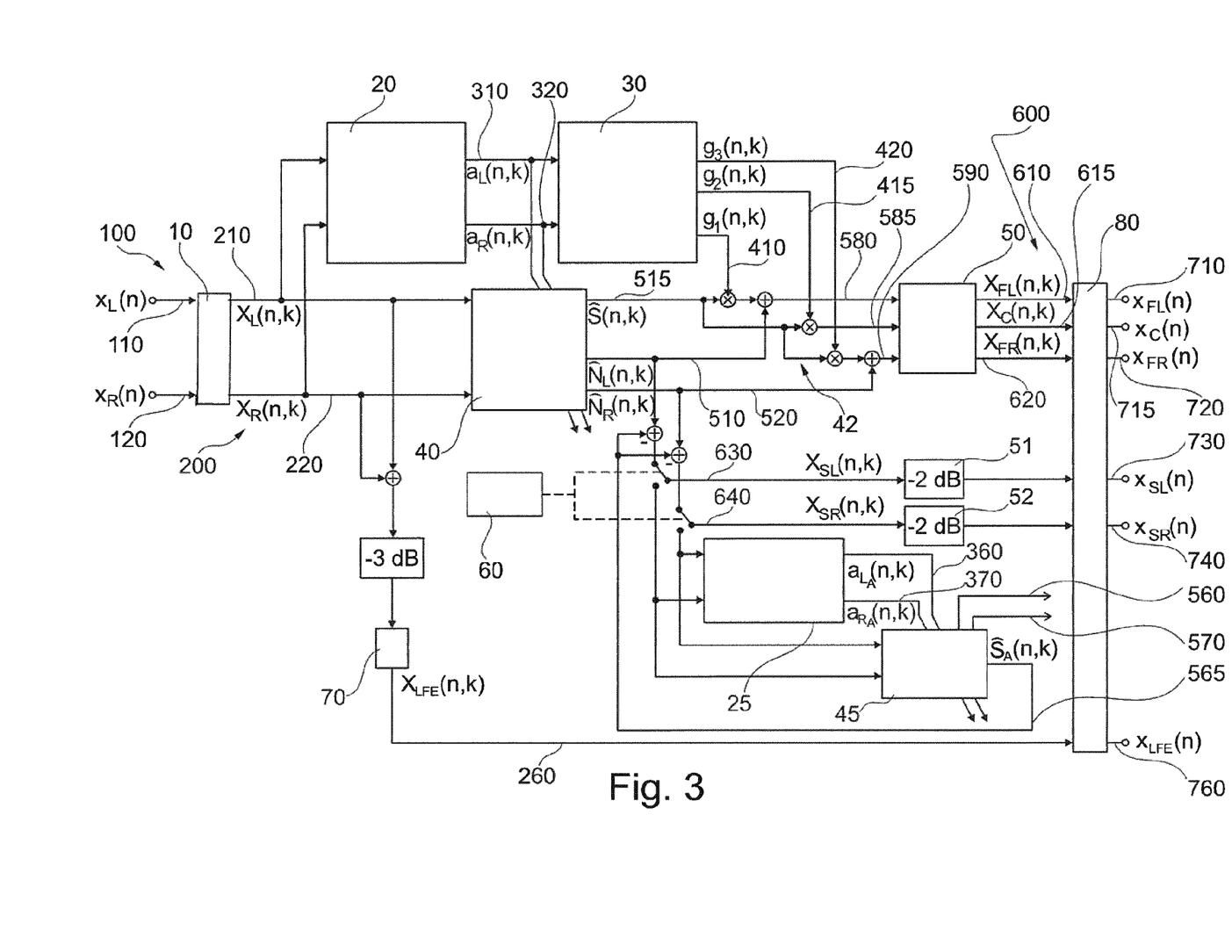
FIG. 3 shows a schematic representation of a method in accordance with an exemplary embodiment of the invention.

FIG. 3 shows a schematic block diagram of the method in accordance with an exemplary embodiment of the invention. The functionality of the individual blocks, together with the interactions between the blocks, ensues from the following detailed description.

Firstly the two discrete time input signals, $x_L(n)$ (left-hand stereo audio signal) and $x_R(n)$ (right-hand stereo audio signal), which are sampled with a sampling frequency $f_A$, are transformed from the time domain into the frequency domain. The signals $x_L(n)$ and $x_R(n)$ are thus transformed to $X_L(n,k)=|X_L(n,k)|.e^{j\phi L(n,k)}$ and $X_R(n,k)=|X_R(n,k)|.e^{j\phi R(n,k)}$, where n corresponds to the time index and k to the frequency index.

The power levels of the input signals are then calculated. Here the operator E{ } applies to the expectation value of the included argument. Since an audio signal can be described as a random signal and moreover can have a positive or negative sign, its expectation value, which corresponds to the average value (expectation value of the first order) is equal to zero. In contrast the expectation value of the second order of an audio signal corresponds to its autocorrelation function and thus to the average power level. The power level of the left-hand input signal $P_{XL}$, is thus determined as:

$$P_{X_L}(n,k)=E\{X_L^2(n,k)\} \qquad (1)$$

and corresponds to the autocorrelation $r_{LL}(n,k)$ of the left-hand input signal. The power level of the right-hand input signal $P_{XR}$ is determined as:

$$P_{X_R}(n,k)=E\{X_E^2(n,k)\} \qquad (2)$$

and corresponds to the autocorrelation $r_{RR}(n,k)$ of the right-hand input signal. The cross correlation $r_{LR}(n,k)=r_{RL}(n,k)$ between the left-hand and right-hand input signals is given by:

$$r_{LR}(n,k)=E\{X_L(n,k) \cdot X_R(n,k)\} \qquad (3)$$

Signal Model:

In order to be able to extract various signal components from a stereo audio signal the definition of a signal model is required in the first instance. This model is described as follows:

$$X_L(n,k)=a_L(n,k) \cdot S(n,k)+N_L(n,k)$$

$$X_R(n,k)=a_R(n,k) \cdot S(n,k)+N_R(n,k) \qquad (4)$$

The left-hand input signal $X_L(n,k)$ consists of the direct signal $S(n,k)$ and the left-hand ambience signal $N_R(n,k)$, where the direct signal is multiplied by the left-hand panning coefficient $a_R(n,k)$. The right-hand input signal $X_R(n,k)$ likewise consists of the direct signal $S(n,k)$ and the right-hand ambience signal $N_R(n,k)$, where the direct signal is multiplied by the right-hand panning coefficient $a_R(n,k)$. A direct signal is to be understood as any signal emitted directly from a sound source. The ambience signals correspond to the reverberations and reflections of the direct signal in space and are thus essential for providing an impression of space over the stereo panorama. Since the direct signal $S(n,k)$, appropriately weighted, is reproduced via both loudspeakers of a stereo configuration, a phantom sound source 811, 812 $x_p$ arises, which can be positioned anywhere between the two loudspeakers in the listening region 890, as can be seen from FIG. 1. The two panning coefficients $a_L(n,k)$ and $a_R(n,k)$ determine the direction from which the phantom sound source is perceived, and are linked together via the relationship:

$$a_L^2(n,k) + a_R^2(n,k) = 1 \qquad (5)$$

With the aid of the signal extraction process the two ambience signals, together with the direct signal, are now extracted from a stereo audio signal.

Signal Extraction:

In order to extract from the input signals $X_L(n,k)$ and $X_R(n,k)$ the contained direct signal $S(n,k)$, together with the two ambience signals $N_L(n,k)$ and $N_R(n,k)$, the input signals must simply be multiplied with the extraction matrix $\underline{A}^+(n,k)$. For the estimated signals $\hat{S}(n,k)$, $\hat{N}_L(n,k)$ and $\hat{N}_R(n,k)$ the following therefore applies:

$$\begin{bmatrix} \hat{S}(n,k) \\ \hat{N}_L(n,k) \\ \hat{N}_R(n,k) \end{bmatrix} = \underline{A}^+(n,k) \cdot \begin{bmatrix} X_L(n,k) \\ X_R(n,k) \end{bmatrix} \qquad (6)$$

with $$\underline{A}^+(n,k) = \qquad (7)$$
$$\frac{1}{a_L^2(n,k) + a_R^2(n,k) + r} \cdot \begin{bmatrix} a_L(n,k) & a_R(n,k) \\ a_r^2(n,k) + r & -a_L(n,k) \cdot a_R(n,k) \\ -a_L(n,k) \cdot a_R(n,k) & a_L^2(n,k) \mid r \end{bmatrix}.$$

The extraction matrix $\underline{A}^+(n,k)$ is composed of the two panning coefficients $a_L(n,k)$ and $a_R(n,k)$, together with a variable parameter $r$.

Determination of the Panning Coefficients $a_L(n,k)$ and $a_R(n,k)$:

For the extraction of the signals $\hat{S}(n,k)$, $\hat{N}_L(n,k)$ and $\hat{N}_R(n,k)$ the panning coefficients $a_L(n,k)$ and $a_R(n,k)$ must be determined, in order to be able to calculate the pseudo-inverse matrix $\underline{A}^+(n,k)$ completely. Since the panning coefficients are contained in the input signals it must be possible to determine these by means of an elegant consideration of the input signals Consideration of the power levels of the input signals is convenient for this purpose. In other words the determination of a first power level of the first audio signal and a second power level of the second audio signal is required for this purpose. Here the autocorrelations $r_{LL}(n,k)$ and $r_{RR}(n,k)$ describe the power levels of the input signals $X_L(n,k)$ and $X_R(n,k)$. The cross correlation $r_{LR}(n,k)$ describes the similarity of the input signals. A particular measure of similarity is given by the normalised cross correlation. For the determination of the panning coefficients $a_L(n,k)$ and $a_R(n,k)$ the cross correlation of the input signals, normalised by the sum of the two autocorrelations, is elegantly used as a so-called similarity function $\Psi(n,k)$:

$$\psi(n,k) = 2 \cdot \frac{r_{LR}(n,k)}{r_{LL}(n,k) + r_{RR}(n,k)}. \qquad (8)$$

In other words the autocorrelations of the first audio signal and the second audio signal are determined, together with determining the cross correlation of the first audio signal and the second audio signal. A similarity function is then determined from the ratio of the cross correlation and the sum of the autocorrelations of the first and second audio signals, as given by equation 8.

Alternatively this last-mentioned step can also be carried out by expressing the autocorrelation of the first audio signal or the second audio signal as the expectation value of the product of the first or the second audio signal with itself. The cross correlation can be expressed as the expectation value of the product of the first audio signal and the second audio signal. Thus the similarly function is determined from the ratio of the expectation value of the product of the first audio signal with the second audio signal and the sum of the expectation value of the product of the first audio signal with itself and the expectation value of the product of the second audio signal with itself.

The factor 2 serves to normalise the process. This ensures that $\Psi(n,k)$ has the value one, if both input signals possess the same power level. The factor can also be neglected for the following calculations. The equations alter accordingly. The use of the cross correlation normalised by the product of the two autocorrelations has not proved to be expedient, since this expression entails the risk of a division by zero, if one of the two input signals and therefore its power level corresponds to zero. In this case a correct determination of the panning coefficients would not be possible.

An elegant consideration of Equation (8) reveals that this cannot be viewed exclusively as a ratio of power levels. If one, in accordance with equations (1) to (3), replaces the correlations by the corresponding expectation values, then one obtains:

$$\psi(n,k) = 2 \cdot \frac{E\{X_L(n,k) \cdot X_R(n,k)\}}{E\{X_L^2(n,k)\} + E\{X_R^2(n,k)\}}. \qquad (9)$$

Equations (8) and (9) deliver the same result, however, Equation (9) now offers the opportunity of showing which result actually delivers the normalised cross correlation. If one considers Equation (9) and the signal model from Equation (4), it is now possible to reformulate the input signals in accordance with the signal model. Since the panning coefficients are contained in the signal model, an expression should be found as a function of the panning coefficients. Accordingly, one obtains:

$$E\{X_L^2(n,k)\} = E\{(a_L(n,k) \cdot S(n,k) + N_L(n,k))^2\} = \qquad (10)$$
$$E\{a_L^2(n,k) \cdot S^2(n,k) + N_L^2(n,k) + 2 \cdot a_L(n,k) \cdot S(n,k) \cdot N_L(n,k)\} =$$
$$a_L^2(n,k) \cdot P_S(n,k) + P_N(n,k),$$

-continued $$E\{X_R^2(n,k)\} = E\{(a_R(n,k) \cdot S(n,k) + N_R(n,k))^2\} = \quad (11)$$
$$E\{a_R^2(n,k) \cdot S^2(n,k) + N_R^2(n,k) + 2 \cdot a_R(n,k) \cdot S(n,k) \cdot N_R(n,k)\} =$$
$$a_R^2(n,k) \cdot P_S(n,k) + P_N(n,k),$$

$$E\{X_L(n,k) \cdot X_R(n,k)\} = \quad (12)$$
$$E\{(a_L(n,k) \cdot S(n,k) + N_L(n,k)) \cdot (a_R(n,k) \cdot S(n,k) + N_R(n,k))\} =$$
$$E\{a_L(n,k) \cdot a_R(n,k) \cdot S^2(n,k) + a_L(n,k) \cdot S(n,k) \cdot N_R(n,k) +$$
$$a_R(n,k) \cdot S(n,k) \cdot N_L(n,k) + N_L(n,k) \cdot N_R(n,k)\} =$$
$$a_L(n,k) \cdot a_R(n,k) \cdot P_S(n,k)$$

Here $P_S(n,k)$ is the power level of the direct signal, and $P_N(n,k)$ is the power level of the ambience signals. There is a presumption that $P_{NL}(n,k)$ as the power level of the left-hand surround signal, and $P_{NR}(n,k)$ as the power level of the right-hand ambience signal, are equal. They are therefore expressed by $P_N(n,k)$ as the power level of the surround signals.

If one inserts Equations (10) to (12) into Equation (9), one obtains:

$$\Psi(n,k) = 2 \cdot \frac{E\{X_L(n,k) \cdot X_R(n,k)\}}{E\{X_L^2(n,k)\} \cdot E\{X_R^2(n,k)\}} = \quad (13)$$
$$2 \cdot \frac{(a_L(n,k) \cdot a_R(n,k) \cdot P_S(n,k))}{(a_L^2(n,k) \cdot P_S(n,k) + P_N(n,k)) +} =$$
$$(a_R^2(n,k) \cdot P_S(n,k) + P_N(n,k))$$
$$\frac{2 \cdot a_L(n,k) \cdot a_R(n,k) \cdot P_S(n,k)}{(a_L^2(n,k) \cdot a_R^2(n,k)) + P_S(n,k) + 2 \cdot P_N(n,k)} =$$
$$\frac{2 \cdot a_L(n,k) \cdot a_R(n,k) \cdot P_S(n,k)}{P_S(n,k) + 2 \cdot P_N(n,k)}.$$

Under the assumption that no directional ambience components are present, $P_N(n,k)$ is equal to zero and Equation (13) simplifies to:

$$\psi(n,k) = 2 \cdot a_L(n,k) \cdot a_R(n,k) \quad (14)$$

Replacement of the right-hand panning coefficient via the relationship (5) leads to:

$$\psi(n,k) = 2 \cdot a_L(n,k) \cdot \sqrt{1 - a_L^2(n,k)}. \quad (15)$$

Thus it is shown that the normalised cross correlation in accordance with Equation (8) delivers an expression that is simply dependent on the panning coefficient. If it is therefore possible to find, by an elegant consideration of power levels, further expressions in which the panning coefficients are contained, then the panning coefficients could finally be determined.

Two partial similarity functions are introduced as further useful functions, since these also consist of a ratio of power levels, and in comparison to Equation (8) are easily varied. The partial similarity functions consist of the cross correlation of the two input signals normalised with respect to the respective autocorrelation. The left-hand partial similarity function is given by:

$$\psi_L(n,k) = \frac{r_{LR}(n,k)}{r_{LL}(n,k)} \quad (16)$$

and the right-hand function is given by:

$$\psi_R(n,k) = \frac{r_{LR}(n,k)}{r_{RR}(n,k)}. \quad (17)$$

In other words a first partial similarity function is determined as the ratio of the cross correlation of the first and second audio signals and the autocorrelation of the first audio signal, see Equation (16). A second partial similarity function is determined as the ratio of the cross correlation of the first and second audio signals and the autocorrelation of the second audio signal, see Equation (17).

In order to find an expression as a function of the panning coefficients, it is in turn desirable to replace autocorrelations by the corresponding expectation values, and for the input signals to use the signal model in accordance with Equation (4). With the assumption that $P_N(n,k)=0$, this leads to:

$$\psi_L(n,k) = \frac{E\{X_L(n,k) \cdot X_R(n,k)\}}{E\{X_L^2(n,k)\}} = \frac{a_L(n,k) \cdot a_R(n,k) \cdot P_S(n,k)}{a_L^2(n,k) \cdot P_S(n,k) + P_N(n,k)} = \quad (18)$$
$$\frac{a_L(n,k) \cdot a_R(n,k) \cdot P_S(n,k)}{a_L^2(n,k) \cdot P_S(n,k)} = \frac{a_R(n,k)}{a_L(n,k)}$$

and $$\psi_R(n,k) = \frac{E\{X_L(n,k) \cdot X_R(n,k)\}}{E\{X_R^2(n,k)\}} = \frac{a_L(n,k) \cdot a_R(n,k) \cdot P_S(n,k)}{a_R^2(n,k) \cdot P_S(n,k) + P_N(n,k)} = \quad (19)$$
$$\frac{a_L(n,k) \cdot a_R(n,k) \cdot P_S(n,k)}{a_R^2(n,k) \cdot P_S(n,k)} = \frac{a_L(n,k)}{a_R(n,k)}.$$

The partial similarity functions accordingly consist of the ratio of the panning coefficients. Equations (18) and (19) can usefully be combined in order thus to find a common expression, which can elegantly be used hereinafter. By formation of the sum or difference of the two partial similarity functions it is possible for the expression that arises to have a common denominator. The formation of the sum has not proved to be expedient. Formation of the difference $\Delta\Psi$ of the two partial similarity functions and utilisation of relationship (5) leads to:

$$\Delta\psi(n,k) = \quad (20)$$
$$\psi_L(n,k) - \psi_R(n,k) = \frac{a_R(n,k)}{a_L(n,k)} - \frac{a_L(n,k)}{a_R(n,k)} = \frac{a_R^2(n,k) - a_L^2(n,k)}{a_L(n,k) \cdot a_R(n,k)} =$$
$$\frac{(1 - a_L^2(n,k)) - a_L^2(n,k)}{a_L(n,k) \cdot \sqrt{1 - a_L^2(n,k)}} = \frac{1 - 2 \cdot a_L^2(n,k)}{a_L(n,k) \cdot \sqrt{1 - a_L^2(n,k)}}.$$

A comparison of Equation (20) with Equation (15) reveals that the term $a_L(n,k) \cdot \sqrt{(1-a_L^2(n,k))}$ in the difference of the two partial similarity functions $\Delta\Psi(n,k)$ can be replaced by the similarity function $\Psi(n,k)$. Thus Equation (20) simplifies to:

$$\Delta\psi(n,k) = \frac{1 - 2 \cdot a_L^2(n,k)}{\frac{1}{2} \cdot \psi(n,k)}. \quad (21)$$

This expression can be solved for $a_L(n,k)$, where the negative solution is omitted. The conditional equation for the left-hand panning coefficient can accordingly be expressed as:

$$a_L(n,k) = \sqrt{\frac{1}{2} - \frac{1}{4} \cdot \Delta\psi(n,k) + \psi(n,k)} \qquad (22)$$

and can be fully determined from consideration of the power levels of the two input signals $X_L(n,k)$ and $X_R(n,k)$. In accordance with Equation (5) the right-hand panning coefficient is given by:

$$a_R(n,k) = \sqrt{1 - a_L^2(n,k)}. \qquad (23)$$

The first panning coefficient is therefore determined on the basis of a difference of the first and second partial similarity functions, together with the similarity function of the first and second audio signals, and the second panning coefficient is determined on the basis of the first panning coefficient.

It should be noted that in one embodiment the second panning coefficient can be determined, and on this basis the first panning coefficient can then be determined. In the Formula (22) the difference is then to be replaced by a sum of the named operands. Likewise, it should be noted that the difference between the first and second partial similarity functions, necessary for the determination of the panning coefficients, is case-dependent, as is presented further below with reference to Equation (29).

In one embodiment the first panning coefficient is determined on the basis of a product of a difference between the first and second partial similarity functions with a similarity function of the first and second audio signals.

The method, as described above and hereinafter, enables the generation of a multichannel sound on the basis of a stereo audio signal; in other words, the latter is upgraded by means of the method (a so-called up-mix takes place). By means of an elegant consideration of the underlying input signals a resource-saving recalculation can take place, i.e. the method is less computationally intensive, and requires less computing time on a computing processor.

In the calculation of the difference $\Delta\Psi(n,k)$ between the two partial similarity functions $\Psi_L(n,k)$ and $\Psi_R(n,k)$ the result can be the emergence of undesirable ripple in the signal profile. The panning coefficients $a_L(n,k)$ and $a_R(n,k)$, thereby not determined correctly, would lead in the playback of the extracted signals in a multichannel configuration to fluctuations in the directions of the phantom sound sources. Therefore the difference $\Delta\Psi(n,k)$ between the two partial similarity functions must be reconsidered once again. If the partial similarity functions $\Psi_L(n,k)$ and $\Psi_R(n,k)$ are described in terms of correlations, then it is true that:

$$\Delta\psi(n,k) = \frac{r_{LR}(n,k)}{r_{LL}(n,k)} - \frac{r_{LR}(n,k)}{r_{RR}(n,k)}. \qquad (24)$$

If the amplitude of one of the two channels of the input signal approaches or is close to zero, $\Delta\Psi(n,k)$ assumes a value that is very much less than one ($r_{RR}(n,k)$ approaches zero), or greater than one ($r_{LL}(n,k)$ approaches zero). In the last instance this is responsible for the emergence of the ripple. With the aid of equations (10) and (11) the product of the two autocorrelations can be written as:

$$r_{LL}(n,k) \cdot r_{RR}(n,k) = \qquad (25)$$
$$(a_L^2(n,k) \cdot P_S(n,k) + P_N(n,k)) \cdot (a_R^2(n,k) \cdot P_S(n,k) + P_N(n,k)).$$

With the assumption that $P_N(n,k)=0$, Equation (25) becomes:

$$r_{LL}(n,k) \cdot r_{RR}(n,k) = a_L^2(n,k) \cdot a_R^2(n,k) \cdot P_S^2(n,k). \qquad (26)$$

In a comparison with Equation (12) one discerns that the cross correlation is equal to the root of the product of the two autocorrelations (for $P_N(n,k)=0$). It is therefore true that:

$$r_{LR}(n,k) = \sqrt{r_{LL}(n,k) \cdot r_{RR}(n,k)}. \qquad (27)$$

The relationship that has been found can be inserted into Equation (24). Accordingly, it is then true that:

$$\Delta\psi(n,k) = \frac{\sqrt{r_{LL}(n,k) \cdot r_{RR}(n,k)}}{r_{LL}(n,k)} - \frac{\sqrt{r_{LL}(n,k) \cdot r_{RR}(n,k)}}{r_{RR}(n,k)} = \qquad (28)$$
$$\sqrt{\frac{r_{LL}(n,k) \cdot r_{RR}(n,k)}{r_{LL}^2(n,k)}} - \sqrt{\frac{r_{LL}(n,k) \cdot r_{RR}(n,k)}{r_{RR}^2(n,k)}} =$$
$$\sqrt{\frac{r_{RR}(n,k)}{r_{LL}(n,k)}} - \sqrt{\frac{r_{LL}(n,k)}{r_{RR}(n,k)}}.$$

From this, with the above described behaviour of the difference $\Delta\Psi(n,k)$ in accordance with Equation (24) for the cases $r_{LL}(n,k) \geq r_{RR}(n,k)$ and $r_{LL}(n,k) < r_{RR}(n,k)$, it is possible to find the following corrected expression for $\Delta\Psi(n,k)$:

$$\Delta\psi(n,k) = \begin{cases} \psi_L(n,k) - \frac{1}{\psi_L(n,k)}, & r_{LL}(n,k) \geq r_{RR}(n,k) \\ \frac{1}{\psi_R(n,k)} - \psi_R(n,k), & r_{LL}(n,k) < r_{RR}(n,k) \end{cases} = \qquad (29)$$

$$\begin{cases} \frac{r_{LR}(n,k)}{r_{LL}(n,k)} - \frac{r_{LL}(n,k)}{r_{LR}(n,k)}, & r_{LL}(n,k) \geq r_{RR}(n,k) \\ \frac{r_{RR}(n,k)}{r_{LR}(n,k)} - \frac{r_{LR}(n,k)}{r_{RR}(n,k)}, & r_{LL}(n,k) < r_{RR}(n,k) \end{cases}.$$

In this manner the profile of the panning coefficients can be smoothed and the appearance of undesirable ripple can be prevented.

With the aid of the panning coefficients as determined, the extraction matrix $\underline{A}^+(n,k)$ can be fully calculated, and the signal components $\hat{S}(n,k)$, $\hat{N}_L(n,k)$ and $\hat{N}_R(n,k)$ can be extracted in accordance with Equation (6).

Repanning and Distribution of the Extracted Signals:

After the direct signal $\hat{S}(n,k)$ together with the ambience signals $\hat{N}_L(n,k)$ and $\hat{N}_R(n,k)$ have been determined, these must be prepared appropriately for playback via a multichannel loudspeaker system, and distributed to the individual loudspeakers. The direct signal $\hat{S}(n,k)$ is reproduced via all three front loudspeakers (left-hand front, right-hand front, centre front) and in each case is weighted with one of the so-called pairs of panning coefficients. These weighting factors $g_1(n,k)$, $g_2(n,k)$ and $g_3(n,k)$ are panning coefficients with which a pair-wise panning of the direct signal is executed. In this manner the direction of the phantom sound source in the multichannel configuration, taking into account the additional central loudspeaker, is designed to correspond to the direction of the phantom sound source in the original stereo configuration. This direction can be determined with the aid of the panning coefficients $a_L(n,k)$ and $a_R(n,k)$ as determined. The coefficients $g_1(n,k)$ and $g_2(n,k)$ ensure a panning between the left-hand front loudspeaker and the central loudspeaker; the coefficients $g_2(n,k)$ and $g_3(n,k)$ ensure a panning between the central loudspeaker and the right-hand front loudspeaker. If a directional signal is fully panned into the centre, $g_1(n,k)$ and $g_3(n,k)$ are equal to zero, while $g_2(n,k)$ is equal to one. If a directional signal is fully panned to the left (or to the right), $g_2(n,k)$ and $g_3(n,k)$ (or $g_1(n,k)$ and $g_2(n,k)$) are equal to zero, while $g_1(n,k)$ (or $g_3(n,k)$) is equal to one. If a direct signal is panned between the loudspeakers, one panning coefficient is always equal to zero, since the pair-wise panning is only executed between the central loudspeaker and the left-hand or right-hand front loudspeaker. Accordingly, it is true that:

$$g_1(n,k) \cdot g_2(n,k) \cdot g_3(n,k) = 0. \tag{30}$$

Furthermore, the rule from Equation (5) is maintained and thus:

$$g_1^2(n,k) + g_2^2(n,k) + g_3^2(n,k) = 1 \tag{31}$$

In order to be able to determine the weighting factors $g_1(n,k)$, $g_2(n,k)$ and $g_3(n,k)$, the angle of the phantom sound source $\phi(n,k)$ is firstly determined from the panning coefficients $a_L(n,k)$ and $a_R(n,k)$ as:

$$\varphi(n,k) = \tan^{-1}\left(\frac{a_L(n,k) - a_R(n,k)}{a_L(n,k) + a_R(n,k)} \cdot \tan(\varphi_0(n,k))\right) \tag{32}$$

Here $\phi_0(n,k)$ is the angle between the respective loudspeaker of a stereo speaker configuration and the centre line originating from the listening position. The angle $\phi_0(n,k)$ can be set to 30°. However, any other logical angle is also possible, since in the last instance the latter is eliminated from the calculation and has no influence on the pairs of panning coefficients. The angle $\phi(n,k)$ is the angle between the phantom sound source and the centre line originating from the listening position. Equation 12 can also be calculated with the use of sinusoidal terms. However, if the listening position, i.e. the head of the listener, is not exactly aligned, the relationship that is specified is more accurate.

Hereinafter, the two cases $\phi_0(n,k) \geq \phi(n,k) \geq 0°$ and $-\phi_0(n,k) \leq \phi(n,k) < 0°$ must be differentiated. In the first case the direct signal is panned between the left-hand front loudspeaker and the central loudspeaker ($g_3(n,k)=0$); in the second case it is panned between the right-hand front loudspeaker and the central loudspeaker ($g_2(n,k)=0$). Moreover, a new angle $\phi_{0,neu}(n,k)$ is introduced with:

$$\varphi_{0,neu}(n,k) = \frac{1}{2} \cdot \varphi_0(n,k). \tag{33}$$

Each angle in the range $\phi_0(n,k) \geq \phi(n,k) \geq 0°$ is mapped onto the range $\phi_{0,neu}(n,k) \geq \phi(n,k) \geq -\phi_{0,neu}(n,k)$. A phantom sound source that is fully panned to the left accordingly no longer possesses the angle $\phi_0(n,k)$, but $\phi_{0,neu}(n,k)$. A phantom sound source positioned centrally between the left-hand front and central loudspeakers no longer possesses the angle $\frac{1}{2}\phi_0(n,k)$, but 0°. A phantom sound source positioned in the centre no longer possesses the angle 0°, but $-\phi_{0,neu}(n,k)$.

Each angle in the range $-\phi_0(n,k) \leq \phi(n,k) < 0°$ is mapped onto the range $\phi_{0,neu}(n,k) \geq \phi(n,k) \geq -\phi_{0,neu}(n,k)$. A phantom sound source that is positioned fully to the right accordingly no longer possesses the angle $-\phi_0(n,k)$, but $-\phi_{0,neu}(n,k)$. A phantom sound source positioned centrally between the right-hand front and central loudspeakers no longer possesses the angle $-\frac{1}{2}\phi_0(n,k)$, but 0°. From these considerations it is possible to determine the new angle of the phantom sound source $\phi_{neu}(n,k)$. Thus:

$$\varphi_{neu}(n,k) = \tag{34}$$
$$\begin{cases} \varphi(n,k) - \varphi_0(n,k) + \varphi_{0,neu}(n,k), & \varphi_0(n,k) \geq \varphi(n,k) \geq 0° \\ \varphi(n,k) + \varphi_0(n,k) - \varphi_{0,neu}(n,k), & -\varphi_0(n,k) \leq \varphi(n,k) < 0° \end{cases}$$

or, formulated with the left-hand panning coefficient:

$$\varphi_{neu}(n,k) = \begin{cases} \varphi(n,k) - \varphi_0(n,k) + \varphi_{0,neu}(n,k), & a_L(n,k) \geq \sqrt{0.5} \\ \varphi(n,k) + \varphi_0(n,k) - \varphi_{0,neu}(n,k), & a_L(n,k) < \sqrt{0.5} \end{cases}. \tag{35}$$

With the aid of the angles $\phi_{0,neu}(n,k)$ and $\phi_{neu}(n,k)$, two coefficients $a'_L(n,k)$ and $a'_R(n,k)$, not further defined, can now be calculated, in the first instance independently of the case differentiations; these correspond either to the coefficients $g_1(n,k)$ and $g_2(n,k)$, or to $g_2(n,k)$ and $g_3(n,k)$. Equation (32) applies for both the new angles $\phi_{0,neu}(n,k)$ and $\phi_{neu}(n,k)$, together with the panning coefficients $a'_L(n,k)$ and $a'_R(n,k)$. Thus:

$$\frac{\tan(\varphi_{neu}(n,k))}{\tan(\varphi_{0,neu}(n,k))} = \frac{a'_L(n,k) - a'_R(n,k)}{a'_L(n,k) + a'_R(n,k)}. \tag{36}$$

By means of cross-multiplication one obtains:

$$\tan(\varphi_{neu}(n,k)) \cdot a'_L(n,k) + \tan(\varphi_{neu}(n,k)) \cdot a'_R(n,k) = \tag{37}$$
$$\tan(\varphi_{0,neu}(n,k)) \cdot a'_L(n,k) - \tan(\varphi_{0,neu}(n,k)) \cdot a'_R(n,k).$$

Rearrangement and removal of brackets delivers:

$$a_L' \cdot (\tan(\phi_{neu}) - \tan(\phi_{0,neu})) = -a_R' \cdot (\tan(\phi_{0,neu}) + \tan(\phi_{neu})) \tag{38}$$

Rearrangement and replacement of the right-hand panning coefficient via the relationship (5) leads to:

$$a'_L(n,k) = \sqrt{1 - a'^2_L(n,k)} \cdot \frac{(\tan(\varphi_{0,neu}(n,k)) + \tan(\varphi_{neu}(n,k)))}{(\tan(\varphi_{0,neu}(n,k)) - \tan(\varphi_{neu}(n,k)))}. \tag{39}$$

With the abbreviated form:

$$b(n,k) = \frac{(\tan(\varphi_{0,neu}(n,k)) + \tan(\varphi_{neu}(n,k)))}{(\tan(\varphi_{0,neu}(n,k)) - \tan(\varphi_{neu}(n,k)))} \tag{40}$$

squaring of both sides, multiplying out and rearranging gives:

$$0 = a'^2_L(n,k) + a'^2_L(n,k) \cdot b^2(n,k) - \tag{41}$$

$$b^2(n,k) - a'^2_L(n,k) \cdot (1 + b^2(n,k)) - b^2(n,k)$$

Rearrangement and resolution for a'$_L$(n,k) delivers finally:

$$a'_L(n, k) = \sqrt{\frac{b^2(n,k)}{1+b^2(n,k)}} = \sqrt{\frac{1}{1+b^{-2}(n,k)}}, \quad (42)$$

where the negative solution is omitted. In accordance with Equation (5) the coefficient a'$_R$(n,k) is given by:

$$a'_R(n,k) = \sqrt{1 - a'^2_L(n,k)} = \\ \sqrt{1 - \frac{1}{1+b^{-2}(n,k)}} = \sqrt{\frac{1+b^{-2}(n,k)}{1+b^{-2}(n,k)} - \frac{1}{1+b^{-2}(n,k)}} = \\ \sqrt{\frac{b^{-2}(n,k)}{1+b^{-2}(n,k)}} = \sqrt{\frac{1}{1+b^2(n,k)}}. \quad (43)$$

With the aid of the case differentiations and equations (42) and (43) it is now possible to formulate the pairs of panning coefficients as follows:

$$g_1(n,k) = \begin{cases} \sqrt{\frac{1}{1+b^{-2}(n,k)}}, & a_L(n,k) \geq \sqrt{0.5} \\ 1, & a_L(n,k) \geq \sqrt{0.5} \text{ and } \varphi_{neu}(n,k) = \varphi_{0,neu}(n,k) \\ 0, & a_L(n,k) < \sqrt{0.5} \end{cases}, \quad (44)$$

$$g_2(n,k) = \begin{cases} \sqrt{1 g_1^2(n,k)}, & a_L(n,k) \geq \sqrt{0.5} \\ \sqrt{\frac{1}{1+b^{-2}(n,k)}}, & a_L(n,k) < \sqrt{0.5} \end{cases}, \quad (45)$$

$$g_3(n,k) = \begin{cases} 0, & a_L(n,k) \geq \sqrt{0.5} \\ \sqrt{1 - g_2^2(n,k)}, & a_L(n,k) < \sqrt{0.5} \end{cases}. \quad (46)$$

If, in the case a$_L$(n,k)≥√(0.5) the angles φ$_{neu}$(n,k) and φ$_{0,neu}$(n,k) are identical (phantom sound source fully panned to the left), g$_1$(n,k) is set to one, in order to avoid a division by zero in Equation (40).

With the calculated pairs of panning coefficients it is now possible to generate the estimated signals ^X$_{FL}$(n,k), ^X$_{FR}$(n,k) and ^X$_C$(n,k) for the left-hand front loudspeaker, the right-hand front loudspeaker, and the central loudspeaker. As already stated, the direct signal ^S(n,k) is reproduced via all three loudspeakers and is weighted with the respective coefficients g$_1$(n,k), g$_2$(n,k) or g$_3$(n,k). At the same time the ambience signals φN$_L$(n,k) and ^N$_R$(n,k) are also provided to the left-hand and right-hand front speakers so as to maintain the spatial impression in accordance with the original stereo signal. Also in accordance with the signal model the front channels consist of the panned direct signal and the ambience components. By means of the additional central loudspeaker an essentially more stable and higher quality sound impression is achieved compared with the stereo playback. The central loudspeaker contains just the direct signal panned with g$_2$(n,k), in order to emphasise the phantom sound source from this direction. Moreover ambience components from this direction are negligible. The three loudspeaker signals ^X$_{FL}$(n,k), ^X$_{FR}$(n,k) and ^X$_C$(n,k) are accordingly given by:

$$\begin{bmatrix} \hat{X}_{FL}(n,k) \\ \hat{X}_C(n,k) \\ \hat{X}_{FR}(n,k) \end{bmatrix} = \begin{bmatrix} g_1(n,k) & 1 & 0 \\ g_2(n,k) & 0 & 0 \\ g_3(n,k) & 0 & 1 \end{bmatrix} \cdot \begin{bmatrix} \hat{S}(n,k) \\ \hat{N}_L(n,k) \\ \hat{N}_R(n,k) \end{bmatrix}. \quad (47)$$

Post-Scaling:

For power level adjustment of the loudspeaker signals ^X$_{FL}$(n,k), ^X$_{FR}$(n,k) and ^X$_C$(n,k) generated in accordance with Equation (47) a post-scaling process is executed, primarily to reduce the ambience components in the front channels and to adapt the waveform. By this means any dominance of the ambience components over the panned direct signals is to be prevented, as are any falsely arising phantom sound sources. The scaled signals ^X'$_{FL}$(n,k), ^X'$_{FR}$(n,k) and ^X'$_C$(n,k) are given by:

$$\begin{bmatrix} \hat{X}'_{FL}(n,k) \\ \hat{X}'_C(n,k) \\ \hat{X}'_{FR}(n,k) \end{bmatrix} = \begin{bmatrix} \sqrt{\frac{P_{X_{FL}}(n,k)}{P_{\hat{X}_{FL}}(n,k)}} & 0 & 0 \\ 0 & \sqrt{\frac{P_{X_C}(n,k)}{P_{\hat{X}_C}(n,k)}} & 0 \\ 0 & 0 & \sqrt{\frac{P_{X_{FR}}(n,k)}{P_{\hat{X}_{FR}}(n,k)}} \end{bmatrix} \cdot \begin{bmatrix} \hat{X}_{FL}(n,k) \\ \hat{X}_C(n,k) \\ \hat{X}_{FR}(n,k) \end{bmatrix}. \quad (48)$$

Here the power levels P$_{\hat{X}FL}$(n,k), P$_{\hat{X}FR}$(n,k) and P$_{\hat{X}C}$(n,k) are the power levels of the loudspeaker signals estimated in accordance with the conditional Equation (47), and the power levels P$_{XFL}$(n,k), P$_{XFR}$(n,k) and P$_{XC}$(n,k) are the actual power levels of the individual channels. The generated signals are thus to be scaled to the power levels of the actual signals. By means of appropriate consideration of the respective signals with the expression of the power levels via expectation values and the utilisation of signal models and conditional equations, expressions can elegantly be found for the scaling factors.

In order to be able to determine the factors for the scaling process, a reformulation of Equation (6) has proved to be appropriate. Thus:

$$\begin{bmatrix} \hat{S}(n,k) \\ \hat{N}_L(n,k) \\ \hat{N}_R(n,k) \end{bmatrix} = \begin{bmatrix} w_1(n,k) & w_2(n,k) \\ w_3(n,k) & w_4(n,k) \\ w_5(n,k) & w_6(n,k) \end{bmatrix} \cdot \begin{bmatrix} X_L(n,k) \\ X_R(n,k) \end{bmatrix}. \tag{49}$$

The elements of the extraction matrix $\underline{A}^+(n,k)$ are now expressed accordingly in terms of the coefficients $w_1(n,k)$ to $w_6(n,k)$. The estimated power level of the left-hand front channel $P_{\hat{X}_{FL}}(n,k)$ is given by the second order expectation value of the left-hand front loudspeaker signal $\hat{X}_{FL}(n,k)$, which is replaced by the conditional Equation (47):

$$P_{\hat{X}_{FL}}(n,k) = E\{\hat{X}_{FL}^2(n,k)\} = E\{(g_1(n,k) \cdot \hat{S}(n,k))^2\} + \tag{50}$$
$$E\{\hat{N}_L^2(n,k)\} + E\{2g_1(n,k) \cdot \hat{S}(n,k) \cdot \hat{N}_L(n,k)\}.$$

The three second order expectation values should in the interests of clarity be specified individually. For this purpose the conditional equations for $\hat{S}(n,k)$, $\hat{N}_L(n,k)$ and $\hat{N}_R(n,k)$ are inserted in accordance with Equation (49), and the input signals are replaced by the signal model in accordance with Equation (4). Thus:

$$E\{(g_1(n,k) \cdot \hat{S}(n,k))^2\} = g_1^2(n,k) \cdot P_{\hat{S}}(n,k) = \tag{51}$$
$$g_1^2(n,k) \cdot E\{(w_1(n,k) \cdot X_L(n,k) + w_2(n,k) \cdot X_R(n,k))^2\} =$$
$$g_1^2(n,k) \cdot [P_S(n,k) \cdot (w_1(n,k) \cdot a_L(n,k) + w_2(n,k) \cdot a_R(n,k))^2 +$$
$$P_N(n,k) \cdot (w_1^2(n,k) + w_2^2(n,k))].$$

The expression for $E\{\hat{N}_L^2(n,k)\}$ can be derived directly from Equation (51), since the conditional equations for $\hat{S}(n,k)$ and $\hat{N}_L(n,k)$ differ only in terms of the coefficients ($w_3(n,k)$ and $w_4(n,k)$, instead of $w_1(n,k)$ and $w_2(n,k)$), it is just the factor $g_1^2(n,k)$ that is not applicable. Thus:

$$E\{\hat{N}_L^2(n,k)\} = P_S(n,k) \cdot (w_3(n,k) \cdot a_L(n,k) + w_4(n,k) \cdot a_R(n,k))^2 + \tag{52}$$
$$P_N(n,k) \cdot (w_3^2(n,k) + w_4^2(n,k)).$$

The expression $E\{2g_1(n,k) \hat{S}(n,k) \hat{N}_L(n,k)\}$ is given by:

$$E\{2g_1(n,k) \cdot \hat{S}(n,k) \cdot \hat{N}_L(n,k)\} = \tag{53}$$
$$2g_1 \cdot (w_1(n,k) \cdot w_3(n,k) \cdot (a_L^2(n,k) \cdot P_S(n,k) + P_N(n,k)) +$$
$$w_2(n,k) \cdot w_4(n,k) \cdot (a_R^2(n,k) \cdot P_S(n,k) + P_N(n,k)) +$$
$$w_1(n,k) \cdot w_4(n,k) \cdot a_L(n,k) \cdot a_R(n,k) \cdot P_S(n,k) +$$
$$w_2(n,k) \cdot w_3(n,k) \cdot a_L(n,k) \cdot a_R(n,k) \cdot P_S(n,k)).$$

The estimated power level of the right-hand front channel $P_{\hat{X}_{FR}}(n,k)$ is given by the second order expectation value of the right-hand front loudspeaker signal $\hat{X}_{FR}(n,k)$, which is replaced by the conditional equation (47):

$$P_{\hat{X}_{FR}}(n,k) = E\{\hat{X}_{FR}^2(n,k)\} = E\{(g_3(n,k) \cdot \hat{S}(n,k))^2\} + \tag{54}$$
$$E\{\hat{N}_R^2(n,k)\} + E\{2g_3(n,k) \cdot \hat{S}(n,k) \cdot \hat{N}_R(n,k)\}.$$

The three second order expectation values should in the interests of clarity be specified individually and can be derived directly from Equations (51) to (53), since it is just the coefficients in the conditional equations that differ. Thus:

$$E\{(g_3(n,k) \cdot \hat{S}(n,k))^2\} = \tag{55}$$
$$g_3^2(n,k) \cdot [P_S(n,k) \cdot (w_1(n,k) \cdot a_L(n,k) + w_2(n,k) \cdot a_R(n,k))^2 +$$
$$P_N(n,k) \cdot (w_1^2(n,k) + w_2^2(n,k))],$$

$$E\{\hat{N}_R^2(n,k)\} = P_S(n,k) \cdot (w_5(n,k) \cdot a_L(n,k) + w_6(n,k) \cdot a_R(n,k))^2 + \tag{56}$$
$$P_N(n,k) \cdot (w_5^2(n,k) + w_6^2(n,k)),$$

$$E\{2g_3(n,k) \cdot \hat{S}(n,k) \cdot \hat{N}_R(n,k)\} = \tag{57}$$
$$2g_3(n,k) \cdot (w_1(n,k) \cdot w_5(n,k) \cdot (a_L^2(n,k) \cdot P_S(n,k) + P_N(n,k)) +$$
$$w_2(n,k) \cdot w_6(n,k) \cdot (a_R^2(n,k) \cdot P_S(n,k) + P_N(n,k)) +$$
$$w_1(n,k) \cdot w_6(n,k) \cdot a_L(n,k) \cdot a_R(n,k) \cdot P_S(n,k) +$$
$$w_2(n,k) \cdot w_5(n,k) \cdot a_L(n,k) \cdot a_R(n,k) \cdot P_S(n,k)).$$

The estimated power level of the central channel $P_C(n,k)$ is given by the second order expectation value of the central loudspeaker signal $\hat{X}_C(n,k)$, which is replaced by the conditional equation (47): The expression $E\{(g_2(n,k) \hat{S}(n,k))^2\}$ can be derived directly from Equation (51) or (55), since it is just the pair of panning coefficients that differ. Thus:

$$P_{\hat{X}_C}(n,k) = E\{\hat{X}_C^2(n,k)\} = \tag{58}$$
$$g_2^2(n,k) \cdot [P_S(n,k) \cdot (w_1(n,k) \cdot a_L(n,k) + w_2(n,k) \cdot a_R(n,k))^2 +$$
$$P_N(n,k) \cdot (w_1^2(n,k) + w_2^2(n,k))].$$

The actual power levels of the loudspeaker signals $P_{XFL}(n,k)$, $P_{XFR}(n,k)$ and $P_{XC}(n,k)$ are given by the second order expectation values of the actual loudspeaker signals following Equation (47). The actual signals are given by:

$$\begin{bmatrix} X_{FL}(n,k) \\ X_C(n,k) \\ X_{FR}(n,k) \end{bmatrix} = \begin{bmatrix} g_1(n,k) & 1 & 0 \\ g_2(n,k) & 0 & 0 \\ g_3(n,k) & 0 & 1 \end{bmatrix} \cdot \begin{bmatrix} S(n,k) \\ N_L(n,k) \\ N_R(n,k) \end{bmatrix}. \tag{59}$$

The power levels $P_{XFL}(n,k)$, $P_{XFR}(n,k)$ and $P_{XC}(n,k)$ are accordingly determined as:

$$P_{XFL}(n,k) = \tag{60}$$
$$E\{(g_1(n,k) \cdot S(n,k) + N_L(n,k))^2\} = g_1^2(n,k) \cdot P_S(n,k) + P_N(n,k),$$

$$P_{XFR}(n,k) = \tag{61}$$
$$E\{(g_3(n,k) \cdot S(n,k) + N_R(n,k))^2\} = g_3^2(n,k) \cdot P_S(n,k) + P_N(n,k),$$

and $$P_{X_C} = E\{(g_2(n,k) \cdot S(n,k))^2\} = g_2^2(n,k) \cdot P_S(n,k). \quad (62)$$

In order to be able to fully determine the equations (50) to (62), the power level of the direct signal $P_S(n,k)$, together with the power levels of the ambience signals $P_N(n,k)$, must also be determined. With $P_{NL}(n,k)$ as the power level of the left-hand surround signal, and $P_{NR}(n,k)$ as the power level of the right-hand ambience signal, under the assumption that the power levels of the two ambience signals are equal it is true that:

$$P_{N_L}(n,k) = P_{N_R}(n,k) = P_N(n,k) \quad (63)$$

The power levels $P_S(n,k)$ and $P_N(n,k)$ can be determined in turn from an elegant consideration of the power levels of the input signals. Thus it is possible to derive these from the eigenvalues $\lambda_1(n,k)$ and $\lambda_2(n,k)$ of the covariance matrix $\underline{R}(n,k)$. The covariance matrix $\underline{R}(n,k)$ consists of the two autocorrelations ($r_{LL}(n,k)$ and $r_{RR}(n,k)$), together with the cross correlation ($r_{LR}(n,k) = r_{RL}(n,k)$) of the input signals, and is composed as follows:

$$\underline{R}(n,k) = \begin{bmatrix} r_{LL}(n,k) & r_{LR}(n,k) \\ r_{RL}(n,k) & r_{RR}(n,k) \end{bmatrix}. \quad (64)$$

For the eigenvalues it is true that:

$$\lambda_{1,2}(n,k) = \frac{1}{2}\Big(r_{LL}(n,k) + r_{RR}(n,k) \pm \sqrt{(r_{LL}(n,k) - r_{RR}(n,k))^2 + 4 \cdot r_{LR}(n,k) \cdot r_{RL}(n,k)}\Big). \quad (65)$$

If one elegantly replaces the correlations by expectation values and expresses the input signals in terms of the signal model, as is the case in Equations (10) to (12), it can be shown that the eigenvalue $\lambda_2(n,k)$ corresponds directly to the power level of the ambience signals $P_N(n,k)$. The eigenvalue $\lambda_1(n,k)$ corresponds to the sum of the power level of the direct signal $P_S(n,k)$ and the power level of the ambience signals $P_N(n,k)$. The power level of the direct signal is thus given by:

$$P_S(n,k) = \lambda_1(n,k) - \lambda_2(n,k) = \sqrt{(r_{LL}(n,k) - r_{RR}(n,k))^2 + 4 \cdot r_{LR}(n,k) \cdot r_{RL}(n,k)}, \quad (66)$$

and the power level of the ambience signals is given by:

$$P_N(n,k) = \lambda_2(n,k) = \frac{1}{2}\Big(r_{LL}(n,k) + r_{RR}(n,k) - \sqrt{(r_{LL}(n,k) - r_{RR}(n,k))^2 + 4 \cdot r_{LR}(n,k) \cdot r_{RL}(n,k)}\Big). \quad (67)$$

The power level of the ambience signals and the power level of the direct signal thus ensue from an elegant consideration of the power levels of the input signals.

Subsequent Processing of the Ambience Signals:

In the playback of non-correlated ambience signals via the surround loudspeakers, by virtue of the lateral phantom sound sources that are generated the result can be an enhancement of the stereo panorama via the two outer front loudspeakers. However, this contributes significantly to the improvement of the spatial listening experience. In order to reduce this effect together with the dominance of the ambience signals, the surround channels can therefore in general be lowered by 2 dB.

The extracted ambience signals still contain a certain component of the direct signal. The result can likewise be an enhancement of the stereo panorama. In order to reduce the direct component $S_A(n,k)$ that is still contained in the ambience signals, the ambience signals are supplied to the decoder as input signals. Accordingly the following modified signal model is obtained:

$$\hat{N}_L(n,k) = a_{L_A}(n,k) \cdot S_A(n,k) + N_{N_L}(n,k)$$

$$\hat{N}_R(n,k) = a_{R_A}(n,k) \cdot S_A(n,k) + N_{N_R}(n,k). \quad (68)$$

Each ambience signal consists accordingly in turn of an ambience component and a direct component provided with the respective panning coefficient. The extraction of the direct component $\hat{S}_A(n,k)$ contained in the ambience signals follows from Equations (6) and (7). With the variable parameter $r_A$ the following is obtained:

$$\hat{S}_A(n,k) = \frac{1}{a_{L_A}^2(n,k) + a_{R_A}^2(n,k) + r_A} \cdot [a_{L_A}(n,k) \ a_{R_A}(n,k)] \cdot \begin{bmatrix} \hat{N}_L(n,k) \\ \hat{N}_R(n,k) \end{bmatrix}. \quad (69)$$

The panning coefficients, which must be recalculated, in accordance with Equation (22) are given by:

$$a_{L_A}(n,k) = \sqrt{\frac{1}{2} - \frac{1}{4} \cdot \Delta\psi_A(n,k) \cdot \psi_A(n,k)} \quad (70)$$

and $$a_{R_A}(n,k) = \sqrt{1 - a_{L_A}^2(n,k)}. \quad (71)$$

Here it is necessary, needless to say, to refer all power level considerations to the ambience signals. With $r_{LLA}(n,k)$ and $r_{RRA}(n,k)$ as autocorrelations of the left-hand and right-hand ambience signals, together with the cross correlation $r_{LRA}(n,k)$ between the two ambience signals, one obtains:

$$\psi_A(n,k) = 2 \cdot \frac{r_{LR_A}(n,k)}{r_{LL_A}(n,k) + r_{RR_A}(n,k)} \quad (72)$$

and $$\Delta\psi_A = \begin{cases} \dfrac{r_{LR_A}(n,k)}{r_{LL_A}(n,k)} - \dfrac{r_{LL_A}(n,k)}{r_{LR_A}(n,k)}, & r_{LL_A}(n,k) \geq r_{RR_A}(n,k) \\[6pt] \dfrac{r_{RR_A}(n,k)}{r_{LR_A}(n,k)} - \dfrac{r_{LR_A}(n,k)}{r_{RR_A}(n,k)}, & r_{LL_A}(n,k) < r_{RR_A}(n,k) \end{cases} \quad (73)$$

With the determined direct component $\hat{S}_A(n,k)$, contained in the ambience signals, the reduced ambience signals $\hat{N}_{LA}(n,k)$ and $\hat{N}_{RA}(n,k)$ are now determined as:

$$\hat{N}_{LA}(n,k) = \hat{N}_L(n,k) - \hat{S}_A(n,k) \quad (74)$$

and $$\hat{N}_{RA}(n,k) = \hat{N}_R(n,k) - \hat{S}_A(n,k) \quad (75)$$

This process can be iteratively applied as often as required in order to obtain the desired effect in each case. With each iteration step the direct component contained in the ambience signals is reduced.

Also in accordance with Equations (6), (7) and (68) an extraction of the signal components $N_{NL}(n,k)$ and $N_{NR}(n,k)$ is possible; these can be used as signals for two additional loudspeakers (for example, the left-hand rear surround and right-hand rear surround of a 7.1 multichannel configuration).

Generation of the Subwoofer Channel:

An explicit signal for the subwoofer of a multichannel configuration system is necessary if the system itself is to be prevented from generating such a signal from all the channels that are available. Some systems generate, for example, no subwoofer signal at all, or no subwoofer signal in a particular configuration (connected subwoofer cable), and are thus dependent upon an explicit signal.

The subwoofer signal $X_{LFE}(n,k)$ is obtained from low-pass filtering of the two input signals $X_L(n,k)$ and $X_R(n,k)$. For this purpose these are firstly added and adjusted in power level, and are then multiplied by the low-pass transfer function $H_{TP}(k)$. Thus:

$$X_{LFE}(n,k) = \sqrt{0.5} \cdot (X_L(n,k) + X_R(n,k)) \cdot H_{TP}(k) \quad (76)$$

With the use of the low-pass the bandwidth of the subwoofer channel is to be reduced. For this purpose the passing frequency $f_D$ is, for example, selected to be $f_D=120$ Hz, and the blocking frequency $f_S$ is selected to be $f_S=160$ Hz.

Power Level Normalisation:

In order to ensure that the sum of all the power levels of all the extracted channels is equal to the sum of the power levels of the input signals, an optional power level normalisation is necessary. Here all the loudspeakers signals are scaled in the same manner with the factor $q(n,k)$. This is obtained from the power levels of the input and output signals as:

$$q(n,k) = \frac{\sqrt{P_{X_L}(n,k) + P_{X_R}(n,k)}}{\sqrt{\begin{array}{c} P_{X_{FL}}(n,k) + P_{X_C}(n,k) + P_{X_{FR}}(n,k) + \\ P_{X_{SL}}(n,k) + P_{X_{SR}}(n,k) + P_{X_{LFE}}(n,k) \end{array}}} \quad (77)$$

The normalised loudspeaker signals are accordingly given by:

$$X_{FL}(n,k) = q(n,k) \cdot X_{FL}(n,k) \quad (78)$$
$$X_C(n,k) = q(n,k) \cdot X_C(n,k)$$
$$X_{FR}(n,k) = q(n,k) \cdot X_{FR}(n,k)$$
$$X_{SL}(n,k) = q(n,k) \cdot X_{SL}(n,k)$$
$$X_{SR}(n,k) = q(n,k) \cdot X_{SR}(n,k)$$
$$X_{LFE}(n,k) = q(n,k) \cdot X_{LFE}(n,k).$$

After all the signals have been generated these are transformed from the frequency domain into the time domain.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

LIST OF REFERENCE SIGNS USED

1 Listener, listener position
10 Stereo audio signal transformation unit: time domain into frequency domain (STFT)
20 Panning coefficient calculation unit
25 Panning coefficient calculation unit
30 Repanning coefficient calculation unit
40 Signal extraction unit
42 Processing unit
45 Signal extraction unit
50 Scaling unit
51, 52 Damping units
60 Switching unit for determining the iteration steps for the calculation of the fourth and fifth surround signals
70 Low-pass filter
80 Multichannel audio signal transformation unit: frequency domain into time domain (ISTFT)
90 Output audio signal for a stereo audio signal
100 Stereo audio signal
110 First audio signal
120 Second audio signal
200 Stereo audio signal transformed into the frequency domain
210 Transformed first audio signal
220 Transformed second audio signal
260 Low-frequency audio signal
310 First panning coefficient of the stereo audio signal
320 Second panning coefficient of the stereo audio signal
360 Fourth panning coefficient
370 Fifth panning coefficient
410 First repanning coefficient
415 Second repanning coefficient
420 Third repanning coefficient
510 First surround signal
515 Direct signal
520 Second surround signal
560 Sixth surround signal
565 Direct signal components contained in the first and second surround signals
570 Seventh surround signal
580 First sound channel
585 Second sound channel
590 Third sound channel
600 Playback signals
610 First playback signal
615 Second playback signal
620 Third playback signal
630 Fourth playback signal
640 Fifth playback signal 700 Sound channel
710 First sound channel
715 Second sound channel
720 Third sound channel
730 Fourth sound channel
740 Fifth sound channel
760 Low-frequency sound channel
811, 812 Phantom sound source
800, 810, 815, 820, 830, 840, 860 Playback devices, loudspeakers
890 Listening region

The invention claimed is:

1. A method for generating a multichannel audio signal from a stereo audio signal, wherein the stereo audio signal comprises:
a first audio signal for a left-hand playback device, and
a second audio signal for a right-hand playback device;
the method comprising the steps of:
determining a first power level of the first audio signal and a second power level of the second audio signal;
determining the autocorrelation of the first audio signal and the second audio signal, and determining the cross correlation of the first audio signal and the second audio signal;
determining a similarity function from the ratio of the expectation value of the cross correlation and the expectation value of the sum of the autocorrelations of the first and second audio signals;
determining a first partial similarity function as the ratio of the cross correlation of the first and second audio signals and the autocorrelation of the first audio signal;
determining a second partial similarity function as the ratio of the cross correlation of the first and second audio signals and the autocorrelation of the second audio signal;
determining a first panning coefficient and a second panning coefficient of the stereo audio signal, wherein the first panning coefficient is determined on the basis of the first and second partial similarity functions, and on the basis of the similarity function of the first and second audio signals, and the second panning coefficient is determined on the basis of the first panning coefficient,
wherein the first panning coefficient and the second panning coefficient are adapted so as to position a phantom sound source in a listening region between the left-hand playback device and the right-hand playback device;
determining a direct signal and a first surround signal and a second surround signal from the first audio signal and the second audio signal, and from the first panning coefficient and the second panning coefficient;
wherein a fourth panning coefficient and a fifth panning coefficient are determined from the first surround signal and from the second surround signal;
wherein the fourth panning coefficient and the fifth panning coefficient are configured so as to determine components of the direct signal contained in the first surround signal and the second surround signal;
wherein the first surround signal and the second surround signal are in each case reduced by the components of the direct signal contained in them;
wherein the reduced first surround signal is assigned to a left-hand rear sound channel; and
wherein the reduced second surround signal is assigned to a right-hand rear sound channel;
determining a multitude of repanning coefficients from the panning coefficients, wherein each repanning coefficient of the multitude of repanning coefficients is assigned to a sound channel of a multitude of sound channels of the multichannel audio signal, wherein the repanning coefficients for the multitude of sound channels are adapted so as to position a phantom sound source in a listening region between a multitude of playback devices for the multichannel audio signal,
wherein from the multitude of playback devices for the multichannel audio signal in each case one playback device is assigned to a sound channel of the multitude of sound channels;
processing of the direct signal with each of the repanning coefficients of the multitude of repanning coefficients in each case, wherein
the direct signal processed with a first repanning coefficient, and the additively added first surround signal, is assigned to a first sound channel,
the direct signal processed with a second repanning coefficient, is assigned to a second sound channel, and
the direct signal processed with a third repanning coefficient, and the additively added second surround signal, is assigned to a third sound channel, and
converting each sound channel in each case into a playback signal of the multichannel audio signal, wherein each playback signal is provided in each case for a playback device.

2. The method in accordance with claim 1, further comprising the step of:
outputting of each sound channel to one playback device in each case.

3. The method in accordance with one of the claim 2, further comprising the step of:
outputting of each sound channel to a recording unit.

4. The method in accordance with claim 3, wherein
before the output of each sound channel to one playback device in each case, a power level adjustment of the sound channel takes place such that the power level of the surround signal is reduced relative to that of the processed direct signal.

5. The method in accordance with claim 4, wherein
the sum of the first audio signal and the second audio signal is low-pass filtered, and represents a low-frequency sound channel, wherein the low-frequency sound channel is one of the sound channels of the multichannel audio signal.

6. The method in accordance with claim 1, wherein
the fourth panning coefficient and the fifth panning coefficient are configured so as to determine components of a sixth surround signal and a seventh surround signal contained in the first surround signal and the second surround signal;
wherein the sixth surround signal and the seventh surround signal are in each case assigned to another sound channel of the multichannel audio signal.

7. The method in accordance with claim 1,
wherein the fourth panning coefficient and the fifth panning coefficient are iteratively determined from the reduced first surround signal and the reduced second surround signal;
wherein before each iteration of the determination of the fourth panning coefficient and the fifth panning coefficient the first surround signal and the second surround signal are reduced by the components of the direct signal contained in them.

8. The method in accordance with claim 7, wherein
the first panning coefficient and the second panning coefficient of the first audio signal and the second audio signal are calculated for a multitude of frequencies of the stereo audio signal.

9. The method in accordance with claim 8, wherein
the first panning coefficient and the second panning coefficient of the first audio signal and the second audio signal are each recurrently redetermined after a defined period of time.

10. A method for generating a multichannel audio signal from a stereo audio signal,
the method comprising the steps:
transforming a first audio signal and a second audio signal of the stereo audio signal from the time domain into the frequency domain;
determining a first power level of the first audio signal and a second power level of the second audio signal;
determining the autocorrelation of the first audio signal and the second audio signal, and determining the cross correlation of the first audio signal and the second audio signal;
determining a similarity function from the ratio of the expectation value of the cross correlation and the expectation value of the sum of the autocorrelations of the first and second audio signals;
determining a first partial similarity function as the ratio of the cross correlation of the first and second audio signals and the autocorrelation of the first audio signal;
determining a second partial similarity function as the ratio of the cross correlation of the first and second audio signals and the autocorrelation of the second audio signal;
determining a first panning coefficient and a second panning coefficient of the stereo audio signal, wherein the first panning coefficient is determined on the basis of the first and second partial similarity functions, and on the basis of the similarity function of the first and second audio signals, and the second panning coefficient is determined on the basis of the first panning coefficient,
wherein the first panning coefficient and the second panning coefficient are adapted so as to position a phantom sound source in a listening region between the left-hand playback device and the right-hand playback device;
determining a direct signal and a first surround signal and a second surround signal from the first audio signal and the second audio signal, and from the first panning coefficient and the second panning coefficient;
wherein a fourth panning coefficient and a fifth panning coefficient are determined from the first surround signal and from the second surround signal;
wherein the fourth panning coefficient and the fifth panning coefficient are configured so as to determine components of the direct signal contained in the first surround signal and the second surround signal;
wherein the first surround signal and the second surround signal are in each case reduced by the components of the direct signal contained in them;
wherein the reduced first surround signal is assigned to a left-hand rear sound channel; and
wherein the reduced second surround signal is assigned to a right-hand rear sound channel;
determining a multitude of repanning coefficients from the panning coefficients, wherein each repanning coefficient of the multitude of repanning coefficients is assigned to a sound channel of a multitude of sound channels of the multichannel audio signal, wherein the repanning coefficients for the multitude of sound channels are adapted so as to position a phantom sound source in a listening region between a multitude of playback devices for the multichannel audio signal,
wherein from the multitude of playback devices for the multichannel audio signal in each case one playback device is assigned to a sound channel of the multitude of sound channels;
processing of the direct signal with each of the repanning coefficients of the multitude of repanning coefficients in each case, wherein
the direct signal processed with a first repanning coefficient, and the additively added first surround signal, is assigned to a first sound channel,
the direct signal processed with a second repanning coefficient, is assigned to a second sound channel, and
the direct signal processed with a third repanning coefficient, and the additively added second surround signal, is assigned to a third sound channel, and
converting each sound channel in each case into a playback signal of the multichannel audio signal, wherein each playback signal is provided in each case for a playback device; and
transforming playback signals from the frequency domain into the time domain.

11. An audio signal processing device for generating a multichannel audio signal from a stereo audio signal, with a first audio signal and a second audio signal, the audio signal processing device comprising:
a panning coefficient calculation unit, which is adapted so as to:
determine a first panning coefficient and a second panning coefficient from the stereo audio signal,
determine a first power level of the first audio signal and a second power level of the second audio signal,
determine the autocorrelation of the first audio signal and the second audio signal, and determine the cross correlation of the first audio signal and the second audio signal,
determine a similarity function from the ratio of the expectation value of the cross correlation and the expectation value of the sum of the autocorrelations of the first and second audio signals,
determine a first partial similarity function as the ratio of the cross correlation of the first and second audio signals and the autocorrelation of the first audio signal,
determine a second partial similarity function as the ratio of the cross correlation of the first and second audio signals and the autocorrelation of the second audio signal;
wherein the first panning coefficient is determined on the basis of the first and second partial similarity functions, and on the basis of the similarity function of the first and second audio signals, and the second panning coefficient is determined on the basis of the first panning coefficient; and
wherein the first panning coefficient and the second panning coefficient are configured so as to position a phantom sound source in a listening region between a left-hand playback device and a right-hand playback device;
a signal extraction unit, which is adapted so as to determine a direct signal and a first surround signal and a second surround signal from the first audio signal and the second audio signal, and from the first panning coefficient and the second panning coefficient, wherein a fourth panning coefficient and a fifth panning coefficient are determined from the first surround signal and from the second surround signal;

wherein the fourth panning coefficient and the fifth panning coefficient are configured so as to determine components of the direct signal contained in the first surround signal and the second surround signal;

wherein the first surround signal and the second surround signal are in each case reduced by the components of the direct signal contained in them;

wherein the reduced first surround signal is assigned to a left-hand rear sound channel; and wherein the reduced second surround signal is assigned to a right-hand rear sound channel;

a repanning coefficient calculation unit, which is adapted so as to determine a multitude of repanning coefficients from the panning coefficients, wherein each repanning coefficient of the multitude of repanning coefficients is adapted so as to be assigned to a sound channel of a multitude of sound channels of the multichannel audio signal;

wherein the repanning coefficients for the multitude of sound channels are configured so as to position a phantom sound source in a listening region between a multitude of playback devices for the multichannel audio signal; wherein from the multitude of playback devices for the multichannel audio signal one playback device can be assigned in each case to a sound channel of the multitude of sound channels;

a processing unit, which is adapted so as to process the direct signal with each of the repanning coefficients of the multitude of repanning coefficients in each case, wherein the direct signal processed with a first repanning coefficient, and the additively added first surround signal can be assigned to a first sound channel, the direct signal processed with a second repanning coefficient can be assigned to a second sound channel, and the direct signal processed with a third repanning coefficient, and the additively added second surround signal, can be assigned to a third sound channel.

12. The audio signal processing device in accordance with claim 11, further comprising:

a stereo audio signal transformation unit, which is adapted so as to transform the stereo audio signal from the time domain into the frequency domain;

a scaling unit, which is adapted so as to carry out a power level adjustment of each sound channel of the multitude of sound channels; and a multichannel audio signal transformation unit, which is adapted so as to transform the sound channels, power level adjusted by the scaling unit, from the frequency domain into the time domain.

\* \* \* \* \*